(12) United States Patent
Collura et al.

(10) Patent No.: US 9,298,619 B2
(45) Date of Patent: *Mar. 29, 2016

(54) CACHE LINE HISTORY TRACKING USING AN INSTRUCTION ADDRESS REGISTER FILE STORING MEMORY LOCATION IDENTIFIER

(71) Applicant: International Business Machines Corporation, Armonk, NY (US)

(72) Inventors: Adam B. Collura, Hyde Park, NY (US); Brian R. Prasky, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,121

(22) Filed: Nov. 19, 2013

(65) Prior Publication Data

US 2014/0075120 A1 Mar. 13, 2014

Related U.S. Application Data

(63) Continuation of application No. 13/523,686, filed on Jun. 14, 2012, now Pat. No. 9,213,641.

(51) Int. Cl.
*G06F 12/08* (2006.01)
*G06F 9/38* (2006.01)
*G06F 11/34* (2006.01)

(52) U.S. Cl.
CPC .............. *G06F 12/0811* (2013.01); *G06F 9/38* (2013.01); *G06F 11/34* (2013.01); *G06F 11/3471* (2013.01); *G06F 12/0802* (2013.01); *G06F 2201/885* (2013.01)

(58) Field of Classification Search
CPC .. G06F 12/08; G06F 12/0802; G06F 12/0848
USPC .......................... 711/113, 118–146, 200–211
See application file for complete search history.

(56) References Cited

U.S. PATENT DOCUMENTS

| | | | |
|---|---|---|---|
| 6,237,073 B1 * | 5/2001 | Dean et al. ..................... | 711/202 |
| 6,266,744 B1 | 7/2001 | Hughes et al. | |
| 6,473,832 B1 | 10/2002 | Ramagopal et al. | |
| 7,016,809 B1 | 3/2006 | Gotwals et al. | |

(Continued)

OTHER PUBLICATIONS

Liu, Y; Kaeli, D.R. "Branch-directed and stride-based data cache prefetching." Oct. 7, 1996-Oct. 9, 1996. Computer Design: VLSI in Computers and Processors, 1996. ICCD '96. Proceedings., 1996 IEEE International Conference. pp. 225-230.*

(Continued)

*Primary Examiner* — Mohammad Islam
*Assistant Examiner* — Mikka Liu
(74) *Attorney, Agent, or Firm* — Cantor Colburn LLP; Margaret McNamara

(57) ABSTRACT

Embodiments relate to tracking cache lines. An aspect of embodiments includes performing an operation by a processor. Another aspect of embodiments includes fetching a cache line based on the operation. Yet another aspect of embodiments includes storing in an instruction address register file at least one of (i) an operation identifier identifying the operation and (ii) a memory location identifier identifying a level of memory from which the cache line is populated.

7 Claims, 6 Drawing Sheets

(56) References Cited

U.S. PATENT DOCUMENTS

| | | | |
|---|---|---|---|
| 7,228,534 B2 | 6/2007 | Eruhimov et al. | |
| 7,676,656 B2* | 3/2010 | Luick | 712/219 |
| 7,779,307 B1 | 8/2010 | Favor et al. | |
| 7,827,536 B2 | 11/2010 | Armstrong et al. | |
| 7,865,669 B2 | 1/2011 | Kornegay et al. | |
| 8,024,513 B2 | 9/2011 | Barth, Jr. et al. | |
| 8,032,869 B2 | 10/2011 | Hirai et al. | |
| 8,131,976 B2 | 3/2012 | Doing et al. | |
| 8,327,187 B1* | 12/2012 | Metcalf | 714/10 |
| 8,417,890 B2* | 4/2013 | Jacobi et al. | 711/125 |
| 2002/0087807 A1* | 7/2002 | Gharachorloo et al. | 711/141 |
| 2004/0255145 A1 | 12/2004 | Chow | |
| 2005/0228972 A1 | 10/2005 | Eisen et al. | |
| 2008/0162819 A1* | 7/2008 | Luick | 711/122 |
| 2009/0055594 A1 | 2/2009 | Berg et al. | |
| 2010/0262806 A1 | 10/2010 | Doing et al. | |
| 2011/0307662 A1 | 12/2011 | Jacobi et al. | |

OTHER PUBLICATIONS

Nam Duong ; Dali Zhao ; Taesu Kim ; Cammarota, R. ; Valero, M. ; Veidenbaum, A.V. 2012. Microarchitecture (MICRO), 2012 45th Annual IEEE/ACM International Symposium. pp. 389-400.*

Chen et al. "Dynamic data dependence tracking and its application to branch prediction." The Ninth International Symposium on High-Performance Computer Architecture, 2003. HPCA-9 2003. Proceedings. Feb. 8-12, 2003. pp. 65-76.*

Duong et al., "Improving Cache Management Policies Using Dynamic Reuse Distances," Microarchitechture (MICRO), 2012 45th Annual IEEE/ACM International Symposium, pp. 389-400.

Liu et al., "Branch-Directed and Stride-Based Data Cache Prefetching," Oct. 7, 1996-Oct. 9, 1996, Computer Design: VLSI in Computers and Processors, 1996, ICCD '96, Preceedings., 1996 IEEE International Conference, pp. 225-230.

U.S. Appl. No. 13/523,686; Non-Final Office Action; Date Filed: Jun. 14, 2012; Date Mailed: Apr. 25, 2014, pp. 1-31.

Intel, [online]; [retrieved on Jun. 1, 2012]; retrieved from the Internet http://software.intel.com/sites/products/collateral/XE/Intel__ VTuneAmplifierXE__Brief__101011-2.pdf Intel.com, XE Optimize Performance and Multicore Scalability on Windows* and Linux*, Intel VTune Amplifier XE; pp. 1-3, 2011.

OProfile, [online]; [retrieved on May 29, 2012]; retrived from the Internet http://oprofile.sourceforge.net/about/OProfile, Overview, pp. 1-2; 2011.

J.E. Campbell, et al., "Cache Replacement Methods Using an Address History Stack," IPCOM000117979D, ip.com, pp. 1-9; IBM Technical Disclosure Bulletin, vol. 39, No. 8, Aug. 1996.

R.J. Eickemeyer, et al., "Using History to Improve the Handling of Address Generation Interlocks in Branch Instructions," IPCOM000108030D, ip.com; pp. 1-7; IBM Technical Disclosure Bulletin, vol. 34, No. 8, Jan. 1992.

Ronny L. Arnold, et al., "A Method for Qualifying Instruction Line Prefetch With a Line-Wrapped Cache," IPCOM000007721D, IP.com; pp. 1-4; Motorola, Technical Developments; May 1996.

* cited by examiner

| Cache Line | Operation | Memory location | First Occurrence | |
|---|---|---|---|---|
| 0x7 | Sequential | L3 | 1 | |
| ... | ... | ... | ... | |
| 0x2 | Cond. Branch | L2 | 1 | |
| | | | | |

FIG. 4

```
X100       <instr0>              IAreg=0x7    Line origin=L3    1st occur==1
X102       <instr1>              IAreg=0x7    Line origin=L3    1st occur==1
X104       <instr2>              IAreg=0x7    Line origin=L3    1st occur==1
X106  cond.branch to x200        IAreg=0x7    Line origin=L3    1st occur==1
:::
X10E       <instr6>              IAreg=0x7    Line origin=L3    1st occur==0
X110       <instr7>              IAreg=0x7    Line origin=L3    1st occur==0
:::
X200       <instr10>             IAreg=0x2    Line origin=L2    1st occur==1
X202       <instr20>             IAreg=0x2    Line origin=L2    1st occur==1
X204  cond. branch to x10E       IAreg=0x2    Line origin=L2    1st occur==1
```

FIG. 5

CACHE LINE HISTORY TRACKING USING AN INSTRUCTION ADDRESS REGISTER FILE STORING MEMORY LOCATION IDENTIFIER

CROSS-REFERENCE TO RELATED APPLICATION

This application is a continuation of U.S. patent application Ser. No. 13/523,686, filed Jun. 14, 2012, the disclosure of which is incorporated by reference herein in its entirety.

BACKGROUND

Embodiments relate generally to cache tracking, and more specifically, to cache line history tracking using an instruction address register file.

One of the goals of a microprocessor is to achieve high performance. High performance can be measured by how many instructions are completed per unit of time, such as a clock cycle. The more quickly instructions complete, the better the performance of a microprocessor.

There are, however, inherent hazards that occur when a processor executes a program. The program may encounter a branch instruction that redirects program flow to a different part of the program, causing the processor to redirect and start fetching from the new instruction stream. That new instruction stream may not be in the L1 cache, and therefore not readily available to deliver instructions to the processor. Events such as unexpected branches, incorrectly predicted branch directions and cache misses result in lower processor performance since they delay instruction completion.

Programmers may have some insight into how the instructions of their programs will execute on a microprocessor. Usually the only evidence that can be observed is the direct output of the program. Tools and methods have been developed to provide evidence such as instruction counts and branch history information. Programmers can view instrumentation information from program execution to determine, for example, how often instructions complete. A large gap between instructions completing may be indicative of a cache miss at that point in the program. Closing these gaps is an opportunity to achieve better processor performance. By seeing where program inefficiencies exist from instrumentation data, programmers can employ methods to alleviate such performance problems.

SUMMARY

Embodiments include a method, system, and computer program product for tracking cache lines. An aspect of embodiments includes performing an operation by a processor. Another aspect of embodiments includes fetching a cache line based on the operation. Yet another aspect of embodiments includes storing in an instruction address register file at least one of (i) an operation identifier identifying the operation and (ii) a memory location identifier identifying a level of memory from which the cache line is populated.

Additional features and advantages are realized through the techniques of the disclosed embodiments. Other embodiments and aspects are described in detail herein and are considered a part of the claimed invention. For a better understanding with advantages and features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 4 depicts an instruction address register file in accordance with an embodiment;

FIG. 5 depicts an example of cache line tracking; and

DETAILED DESCRIPTION

Embodiments provide a technique by which program developers can determine where in the memory hierarchy (e.g., L1 cache through main memory) a particular cache line originated from. For each cache line that is active in a program, the memory level that was accessed to acquire the associated item (e.g., instruction or data) is stored in an instruction address register file. This information gives the programmer a better understanding of how the processor is executing a given program. Knowledge of cache line origin assists programmers in modifying code to exploit the processor hardware more efficiently, resulting in improved software performance. Program modifications, such as code restructuring or insertion of preload instructions, may be done more efficiently and effectively with the information delivered by embodiments.

Figure 1:
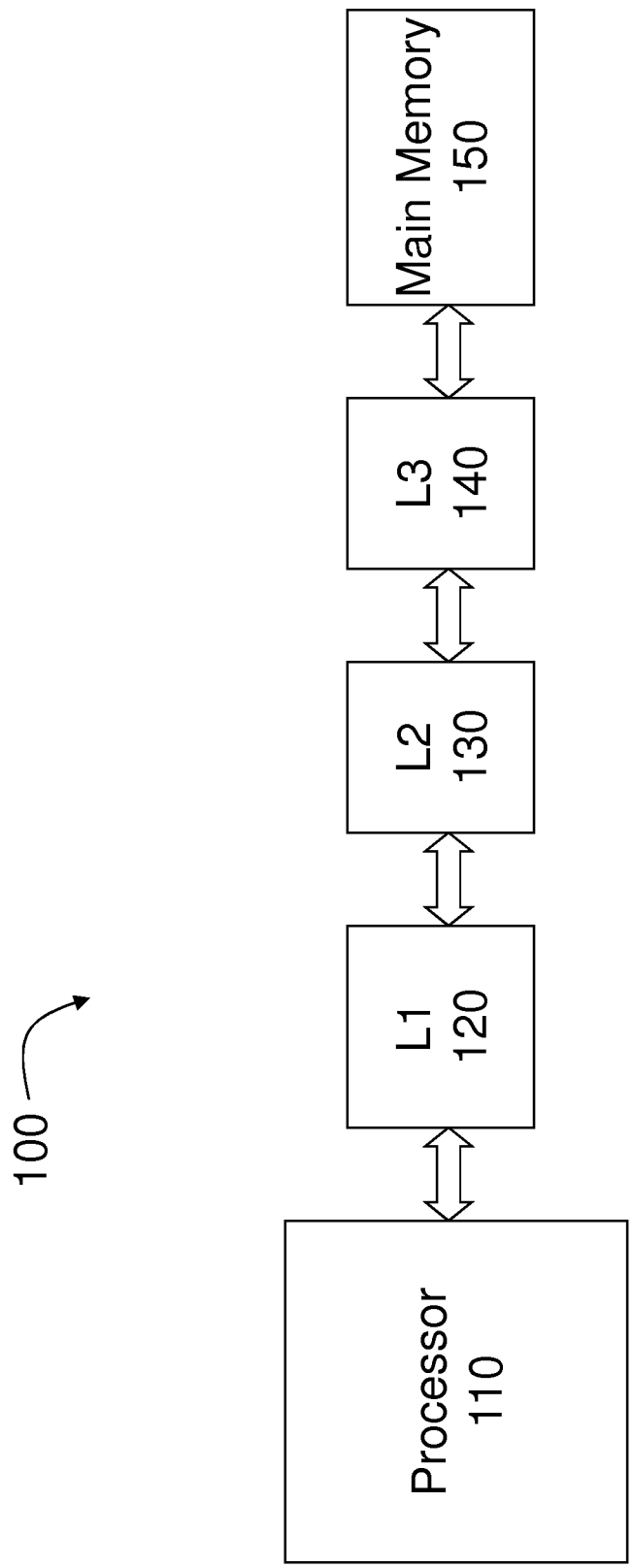
FIG. 1 depicts a computing system in accordance with an embodiment.

FIG. 1 illustrates a computing system 100 in accordance with an embodiment. FIG. 1 depicts a processor 110 connected to a memory hierarchy, which may include an L1 cache 120, L2 cache 130, L3 cache 140 and main memory 150. In this example, the L1 cache 120 is shown outside of the main processor core 110, however L1 cache 120, or any levels of the cache, can reside within the processor 110.

Figure 2:
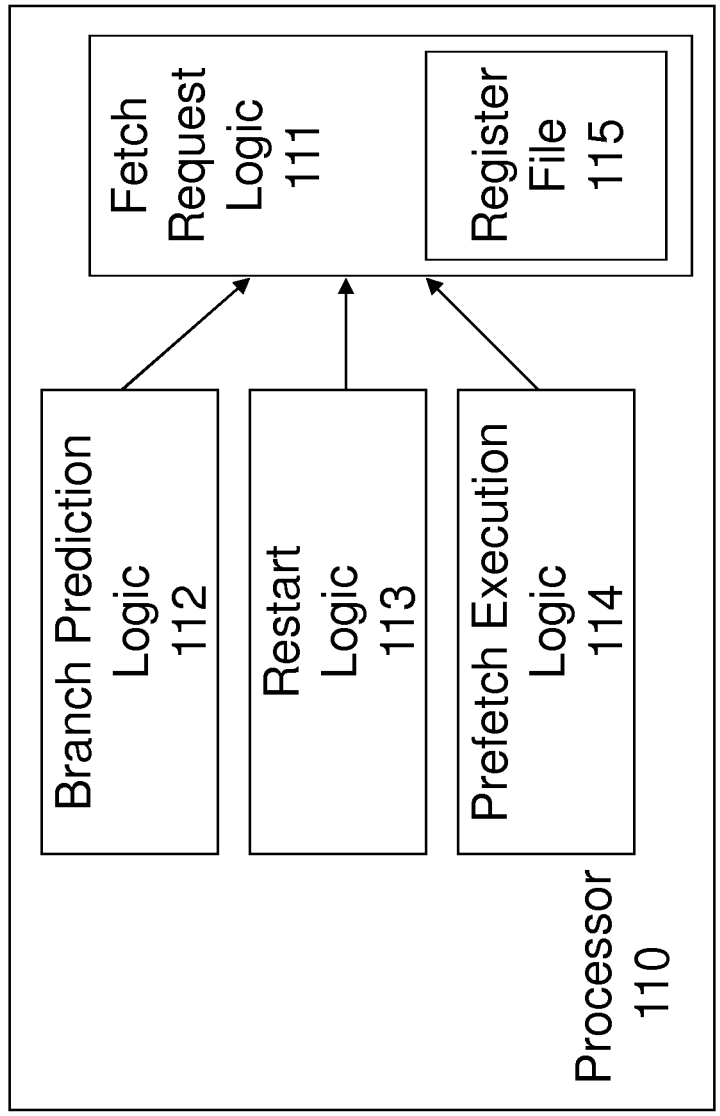
FIG. 2 depicts a processor in accordance with an embodiment.

FIG. 2 illustrates a portion of the internal structure of processor 110 in accordance with an embodiment. Processor 110 may include branch prediction logic 112 which attempts to anticipate future program flow based on history of encountered branches. Restart logic 113 redirects program flow when processor 110 encounters events such as a surprise branch. Prefetch execution logic 114 preemptively attempts to load future cache line information into the cache. These elements send cache line requests to the fetch request logic 111, which in turn, sends fetch requests out of the processor 110 to the memory hierarchy.

Fetch request logic 111 maintains an instruction address register file 115. The instruction address register file 115 is a storage structure used to track all cache lines currently in flight in the processor pipeline. Information about each cache line is stored in instruction address register file 115. This information includes the location in the memory hierarchy where this cache line hit (e.g., L1, L2, L3, main memory, etc.) and what operation (e.g., branch prediction, sequential fetching, surprise branch, etc.) necessitated the allocation of the cache line. Additional information may also be stored in the instruction address register file 115 for other uses beyond the instrumentation purpose descried herein, such as select bits of the instruction address. At a later point in time, the contents of the instruction address register file 115 may be sampled via instrumentation to gain insight as to how the processor 110 executed a given program.

Figure 3:
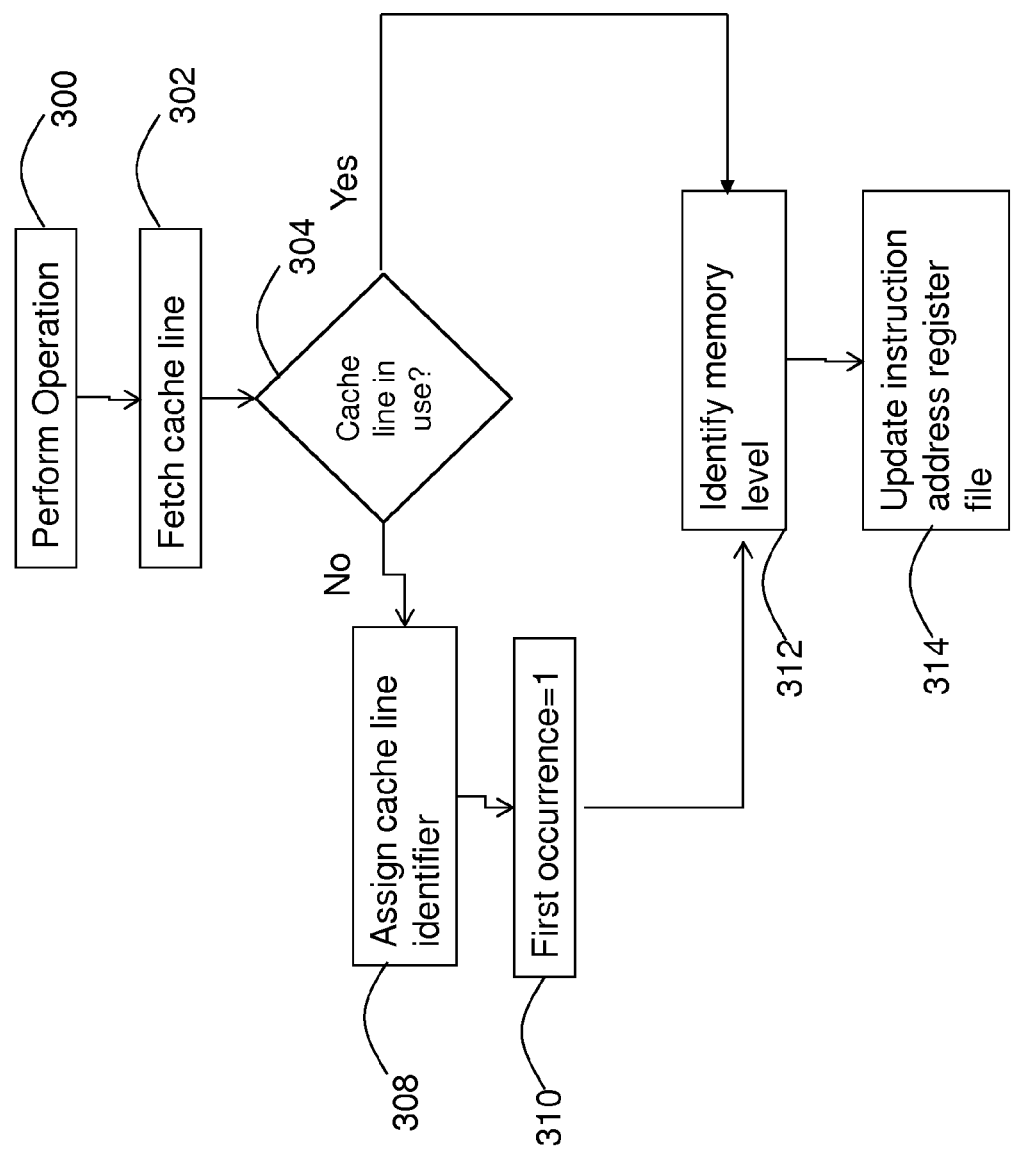
FIG. 3 depicts a process flow for tracking cache lines in accordance with an embodiment.

FIG. 3 depicts a process flow executed by processor 110 for tracking cache lines in accordance with an embodiment. The process begins at block 300 with performing an operation that initiates retrieving a cache line. A cache line can be allocated several ways. A cache line is allocated when the instruction stream sequentially crosses a cache line boundary (e.g., the instruction addresses of a program goes from x0FF to x100 for a 256 byte cache line). A cache line can also be allocated upon redirection, such as when branch prediction logic predicts a taken branch to a new cache line. A cache line can also be allocated upon a restart event, such as when a surprise taken branch branches to a new cache line.

Fetching the cache line occurs at block 302. When a fetch request to a new cache line is made to the fetch request logic 111, an entry in the instruction address register file is allocated for that particular cache line. That cache line is now tracked using the entry in the instruction address register file 115. Identifiers stored in the instruction address register file are described in further detail with reference to FIG. 4.

At block 304, processor 110 determines if the cache line is already being tracked. Before creating a new entry in the instruction address register file, the process checks to see if that cache line is already being tracked with an existing entry in the instruction address register file at block 304. If so, flow proceeds to block 312, where an existing entry in the instruction address register file is used to track the cache line. The first occurrence identifier (e.g., a bit) remains unchanged.

If the cache line is not already in use at block 304, the flow proceeds to block 308 where an entry in the instruction address register file is created for the cache line and the first occurrence identifier is set at block 310 to indicate that this is the first occurrence of the cache line in the instruction address register file.

Block 310 flows to block 312, which involves identifying the memory level of the memory hierarchy at which the cache line hit. The memory level where the cache line hit may be identified using two bits, such that 00 indicates an L1 hit, 01 indicates an L2 hit, 10 indicates an L3 hit and 11 indicates a hit beyond the L3 (e.g., main memory hit, disk, network access, etc.). For instance, if a cache line request was made to the L1 120 and the data was not in the L1 120, the L1 120 makes the same cache line request to the L2 130. If the L2 130 does not have the desired information, it makes a request to the L3 140. If the L3 140 does not have the cache line, it makes a request to the main memory 150. If the main memory 150 contains the desired info, it returns the cache line content to the L3 140, plus a code indicating that the information hit in main memory 150 (11 in this example). This code propagates its way through the different levels of the cache hierarchy until it reaches the fetch request logic 111, where it is stored in the instruction address register file along with an identifier of the cache line requested. It is understood that other memory level identifiers may be used and embodiments are not limited to use of two bits or the regions of memory disclosed herein.

Block 314 involves updating the entry in the instruction address register file for the cache line. FIG. 4 shows an exemplary instruction address register file 400 with a cache line identifier 402, operation identifier 404, memory location identifier 406 and first occurrence identifier 408. The cache line identifier 402 is an arbitrary identifier that corresponds to the entry in the instruction address register file 400. The operation identifier 404 identifies the operation that allocated the cache line (sequential instruction, predicted branch, surprise branch restart, prefetch event, etc.). The memory location identifier 406 indicates where the cache line hit occurred in the memory hierarchy. The first occurrence identifier 408 indicates if the cache line has been tracked previously.

FIG. 5 illustrates an example of population of the instruction address register file 400. For a program that resides at memory location x100, an entry 0x7 in the instruction address register file is arbitrarily initially allocated for this cache line. When attempting to load the program, the cache line data originally resided in the L3 cache 140. The first occurrence identifier would be active indicating that this cache line has not been previously tracked. The memory location identifier 406 indicates where the data originally hit, e.g., the L3 cache 140.

At address x106, the program takes a conditional taken branch to a routine. Since the stream is redirected to a new cache line, another entry (e.g., 0x2) in the instruction address register file 400 is used to track cache line x200, which originally hit in the L2 cache 130. While in this routine, another conditional branch is taken back to the original cache line, x100, to address x10E. This redirection reuses entry 0x7 to continue tracking this cache line. The first occurrence identifier associated with IAreg 0x7 is set to off when the completion logic observes the cache line used changed from 0x7 to 0x2, indicating that this cache line, 0x7, has already been used if it is selected for IAreg reuse in the future. The information indicating the cache line originally hit in the L3 140 would remain.

In one embodiment, the first occurrence identifier can be set during initial allocation time and disabled during completion time. The completion logic would monitor which entry in the instruction address register file is completing. If the completion logic comes across an entry that was just allocated, the first occurrence bit would indicate so. At some point, the completion logic would observe that the entries that are completing change (e.g., it noticed that the current completing entry is 0x2 and the previous completing entry is 0x7). As soon as this occurs, the bit to indicate first occurrence is turned off such that subsequent completions from the reused entry are not considered first occurrences. In this example, IAreg 0x7's first occurrence bit is set to 0 when the completion logic observes that the IAreg at completion time is now IAreg 0x2.

Knowledge of first occurrence of an entry provides additional visibility into code operation and better assists how to optimize code. For instance, if one were to observe information indicating that there was a cache miss delay for entry 0x7 at address x110, one would be inclined to place a prefetch instruction before x110, perhaps at address x202. However, with this additional piece of first occurrence information, one would realize that entry 0x7 at address x110 is not a first occurrence. Therefore, placing a preload for cache line x100 around address x202 may not provide any benefit, as at that point, cache line x100 would now be residing in the L1, yet still originally hit in the L3. Knowing that this is the non-first occurrence of cache line x100 via the first occurrence identifier 408 of entry 0x7, the programmer would know to look for the first occurrence of entry 0x7 and place the preload instruction prior to that timeframe.

The instruction address register file 115 content may be sampled, and the programmer will have access to each cache line in flight in the processor, the reason why the cache line was requested, and the location where the content hit in the memory hierarchy. One could use this information to improve the program code. For instance, if one notices that many of the allocated cache lines are retrieved from the L3 cache, the program could be changed to cause line pre-fetches, thus causing the lines to be fetched from a closer memory element and effectively improving program performance.

The instruction address register file 115 may be accessed by a run-time instrumentation facility. Embodiments of the run-time instrumentation facility enable a program to collect information about program execution, including central processing unit (CPU) data. The collected information allows the program to acquire insights about the program from which the information is collected.

As will be appreciated by one skilled in the art, one or more aspects may be embodied as a system, method or computer program product. Accordingly, one or more aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
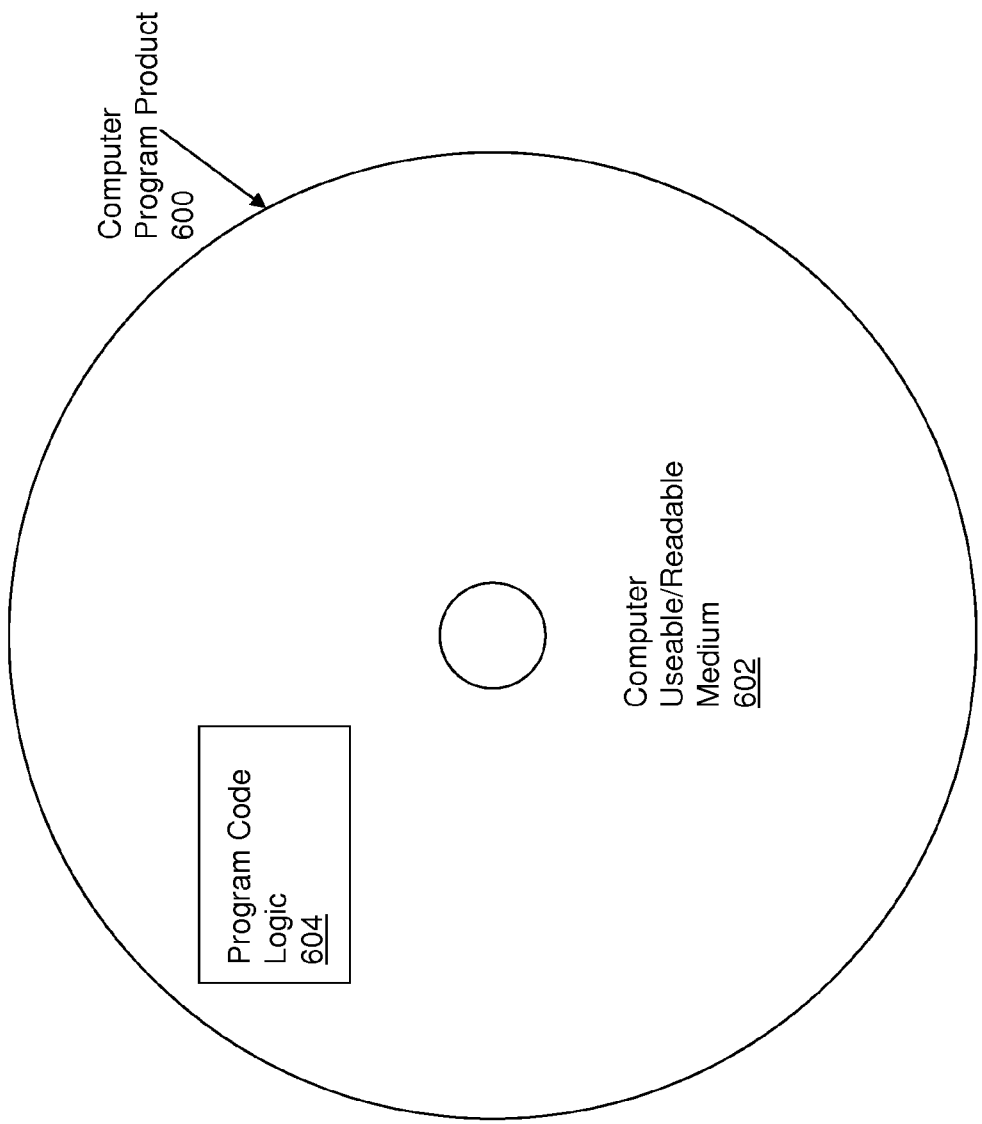
FIG. 6 depicts a computer program product in accordance with an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of embodiments.

Technical effects and benefits include tracking cache line history to identify a memory hit level in a memory hierarchy for the cache line.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for tracking cache lines, the system comprising:
    a processor, the processor comprising fetch request logic for retrieving items from memory, the system configured to perform a method comprising:
        performing an instruction memory access operation, the processor executing program instructions associated with the memory access operation;
        fetching a cache line from a memory hierarchy based on the performing the operation, the memory hierarchy comprising at least one cache and a main storage, wherein the cache line is stored at an address in an original level of the memory hierarchy prior to the performing the memory access operation; and
        based on the performing the operation, storing in an instruction address register file, at an entry corresponding to the cache line, a memory location identifier identifying the original level of the memory hierarchy and identifiers of one or more of the program instructions associated with the memory access operation, wherein the memory location identifier is different than the address; and
    providing access to contents of the instruction address register file for sampling subsequent to completion of the performing, fetching, and storing.

2. The computer system of claim 1, wherein an identifier of a program instruction includes at least a portion of a memory address of the program instruction.

3. The computer system of claim 1, wherein an identifier of a program instruction includes an operation identifier identifying the operation.

4. The computer system of claim 1, the method further comprising:
    storing a first occurrence identifier in the instruction address register file as a function of fetch initializing the register, the first occurrence identifier indicating that a cache line has not been previously tracked by a previous operation and reused for a current operation, wherein the first occurrence identifier is reset upon logic detecting that the instruction address register file has changed.

5. The computer system of claim 4, the method further comprising:
    maintaining the memory location identifier for the cache line that has not been previously tracked by a previous operation and reused for a current operation.

6. The computer system of claim 1, wherein the memory location identifier identifies a level of cache.

7. The computer system of claim 1, wherein the operation includes one of an instruction stream sequentially crossing a cache line boundary, a redirection to a cache line and a restart event branching to a cache line.

* * * * *